US012221342B2

United States Patent
Dhiba et al.

(10) Patent No.: US 12,221,342 B2
(45) Date of Patent: *Feb. 11, 2025

(54) PREPARATION OF AN AQUEOUS SUSPENSION OF PHOSPHATE MATERIAL

(71) Applicants: Coatex, Genay (FR); OCP SA, Casablanca (MA)

(72) Inventors: Driss Dhiba, Casablanca (MA); Benoît Magny, Cailloux-sur-Fontaines (FR); Hamid Mazouz, Casablanca (MA); Céline Methivier, Lyons (FR); Jacques Mongoin, Quincieux (FR)

(73) Assignees: Coatex (FR); OCP SA (MA)

( * ) Notice: Subject to any disclaimer, the term of this patent is extended or adjusted under 35 U.S.C. 154(b) by 1137 days.

This patent is subject to a terminal disclaimer.

(21) Appl. No.: 16/762,746

(22) PCT Filed: Nov. 9, 2018

(86) PCT No.: PCT/FR2018/052797
§ 371 (c)(1),
(2) Date: May 8, 2020

(87) PCT Pub. No.: WO2019/092381
PCT Pub. Date: May 16, 2019

(65) Prior Publication Data
US 2020/0361774 A1    Nov. 19, 2020

(30) Foreign Application Priority Data

Nov. 9, 2017 (FR) ...................................... 1760548

(51) Int. Cl.
| | | |
|---|---|---|
| *C01B 25/01* | (2006.01) | |
| *C01B 25/222* | (2006.01) | |
| *C05B 11/00* | (2006.01) | |
| *C05B 11/08* | (2006.01) | |
| *C08F 20/06* | (2006.01) | |

(52) U.S. Cl.
CPC ............ *C01B 25/01* (2013.01); *C01B 25/222* (2013.01); *C05B 11/00* (2013.01); *C08F 20/06* (2013.01); *C05B 11/08* (2013.01)

(58) Field of Classification Search
CPC ....... C01B 25/01; C01B 25/222; C05B 11/00; C05B 11/08; C08F 20/06
See application file for complete search history.

(56) References Cited

U.S. PATENT DOCUMENTS

| | | |
|---|---|---|
| 4,501,724 A | 2/1985 | Goers |
| 5,183,211 A | 2/1993 | Malito et al. |
| 6,093,764 A | 7/2000 | Egraz et al. |
| 6,213,416 B1 | 4/2001 | Luke |
| 11,702,338 B2 * | 7/2023 | Dhiba ................... C01B 25/222 423/304 |

FOREIGN PATENT DOCUMENTS

| | | |
|---|---|---|
| CN | 103333664 A | 10/2013 |
| CN | 106395879 A | 2/2017 |
| EP | 0892020 A1 | 1/1999 |
| WO | 2015105464 A1 | 7/2015 |

OTHER PUBLICATIONS

International Search Report for Application No. PCT/FR2018/052797 mailed Mar. 4, 2019, 3 pages.

* cited by examiner

*Primary Examiner* — Patrick D Niland
(74) *Attorney, Agent, or Firm* — Lerner David LLP

(57) ABSTRACT

The invention relates to a method for preparing an aqueous suspension of at least one phosphate material, comprising, dispersing, in water, particles of phosphate material in the presence of at least one additive of the anionic polymer of acrylic acid or of methacrylic acid type. The suspension according to the invention has a viscosity of less than 1500 mPa·s. The invention also relates to the conditioning of the phosphate material associated with the anionic polymer, for its subsequent treatment with at least one strong acid, for the industrial preparation of phosphoric acid.

23 Claims, No Drawings

PREPARATION OF AN AQUEOUS SUSPENSION OF PHOSPHATE MATERIAL

CROSS-REFERENCE TO RELATED APPLICATIONS

The present application is a national phase entry under 35 U.S.C § 371 of International Application No. PCT/FR2018/052797 filed Nov. 9, 2018, which claims priority from French Application No. 1760548 filed Nov. 9, 2017, all of which are hereby incorporated herein by reference.

The invention relates to a method for preparing an aqueous suspension of at least one phosphate material comprising dispersion in water of particles of phosphate material in the presence of at least one additive of the acrylic acid or methacrylic acid anionic polymer type. The suspension according to the invention has a viscosity of less than 1,500 mPa·s. The invention also relates to the conditioning of the phosphate material associated with the anionic polymer, for its subsequent treatment by means of at least one strong acid, for the industrial preparation of phosphoric acid.

As such, the method for the industrial preparation of phosphoric acid from an aqueous suspension comprising water and particles of at least one phosphate material dispersed in the presence of at least one additive of the anionic polymer type is also particularly efficient.

The phosphoric acid thus prepared is an essential product for the manufacture of fertilizers, particularly ternary fertilizers, NPK or binary fertilizers, NP. Phosphoric acid is also used as an ingredient in the manufacture of food products, in particular for the acidification of beverages, or for the treatment of metal surfaces or in the field of microelectronics.

Phosphate rocks are important sources of raw material for the manufacture of phosphoric acid. Phosphoric acid ($H_3PO_4$) can be produced mainly by two methods: wet process and thermal process. The wet process is the most widely used and phosphoric acid from this route can be used to produce phosphate fertilizers (diammonium phosphate or DAP, monoammonium phosphate or MAP or, triple superphosphate or TSP). The acid obtained by the thermal process is of higher purity and is generally used for pharmaceuticals, detergents and food products. In a wet process production unit, phosphoric acid is produced in particular by the action of the strong acid on the natural phosphate ore. Sulfuric acid is the most commonly used strong acid, in which case insoluble calcium sulfate is formed, which is separated by filtration to recover gypsum. The operating conditions are chosen to precipitate the calcium sulfate either in its dihydrate form, producing $P_2O_5$ generally at a concentration of 26-32% at 70-80° C., or in the hemihydrate form, with $P_2O_5$ generally at a concentration of 40-52% at 90-110° C. Evaporation can be used to further concentrate the phosphoric acid afterwards and thus optimize the quality of the acid.

Usually, after extraction, the phosphate rock is treated to be obtained either in dry form or in wet form in which it is mixed with water, for example to form phosphate pulp.

After extraction, the phosphate rock can be processed directly or it can be transported. However, in order to facilitate the transport of phosphate rock, it is necessary to be able to control its viscosity, especially when transporting phosphate rock obtained by the wet process.

When transported, the phosphate pulp should have a high concentration of phosphate rock. In particular, during its transport in a pipe.

A high concentration of phosphate rock makes it possible to reduce the amount of water used when treating, handling or transporting a given amount of phosphate rock. In addition to better resource management, the reduction of the amount of water is of particular interest during the various stages of phosphate rock transport, but also during the subsequent stages, particularly during the preparation of phosphoric acid.

In general, there is a need for improved methods to facilitate the conditioning and transport of phosphate rock, particularly in the form of a suspension of phosphate rock particles in water. Improved stability of such suspensions is also sought, including resistance to particle sedimentation or control of dilatancy.

Increasing the amount of solid matter within these suspensions should also be aimed at, as well as controlling the viscosity of these particle suspensions, especially for high concentrations of solid matter.

It is also important to be able to impart improved properties to the phosphate rock particles, in particular properties to improve the efficiency of phosphoric acid preparation methods, for example by improving the hydrodynamics of the phosphoric acid preparation reaction. Thus, it is important to have improved methods for the manufacture of phosphoric acid, in particular to increase the overall efficiency of the reaction for the preparation of phosphoric acid from phosphate rock.

When preparing phosphoric acid from phosphate rock, it is also important to monitor the overall water balance. Water is necessary as a carrier for the treatment of the phosphate rock with a strong acid, but its amount must nevertheless be limited, in particular to avoid diluting the titer of the acid solution produced.

Similarly, when preparing phosphoric acid from phosphate rock, it is important to be able to improve the hydrodynamics when treating the phosphate rock with the strong acid in order to reduce the loss of phosphorus in unattacked or co-crystallized (syncrystallized) form in the crystals of the gypsum formed.

The prior art presents various developments in the phosphoric acid manufacturing process. For example, the document CN 103333664 discloses a grinding aid agent for wet milling of phosphate ore. The document U.S. Pat. No. 5,183,211 discloses a method for reducing the relative viscosity of a phosphate rock slurry during a grinding process in a phosphoric acid production facility. The method includes the steps of adding an effective amount of an acrylamide polymer or of acrylic acid sulfonate.

The document U.S. Pat. No. 6,213,416 discloses a process for grinding phosphate rock in the presence of particles of a water-insoluble, water-swellable polymer. The document EP 0892020 discloses the use of a particular copolymer as a dispersing agent or as grinding aid agent for grinding calcium carbonate in aqueous suspension. The copolymer is prepared from monomers with a surface-active structure.

In addition, the patent WO 2015105464 presents a modification of both the reaction device in order to optimize the solubilization rate of the phosphate rock at higher values and to ensure a better crystallization of the gypsum produced, as well as the filtration method aimed at improving the filterability of the phosphoric acid slurry. As for the patent CN106395879, it aims at improving the size of gypsum crystals during the manufacture of phosphoric acid by the wet process, by using a composite additive composed of a sulfonic acid regulator, a weak organic acid, an ammonium salt buffering agent and a dispersant with a high water-soluble polymer content. In addition, the patent U.S. Pat. No. 4,501,724 proposes a process for the wet process manufacture of concentrated phosphoric acid, based on the use of a mixture of gaseous sulfur trioxide and sulfuric acid instead of concentrated sulfuric acid. This results in a higher heat of reaction allowing the use of a very dilute sulfuric acid or a phosphate from wet milling, without affecting the phosphoric acid titer produced.

The method for preparing an aqueous suspension of phosphate material according to the invention provides a solution to all or part of these problems, in particular by a significant improvement in the conditions of preparation, transport and treatment of phosphate rock pulp.

Preferably, the method for preparing an aqueous suspension of phosphate material according to the invention is not a grinding method, during which the size of the particles remains constant. In other words, the preparation method according to the invention is preferably carried out after grinding of the phosphate rock, preferably the dispersion is carried out after grinding.

Thus, the invention provides a method for preparing an aqueous suspension of at least one phosphate material, the Brookfield viscosity of which, measured 90 s after preparation, at 25° C., at 100 rpm and at a concentration of phosphate material of more than 45% by weight, is less than 1,500 mPa·s, comprising the dispersion in water of particles of phosphate material whose size is between 10 and 400 µm, in the presence of at least one anionic polymer with a molecular mass by weight ($M_W$) ranging from 1,000 to 90,000 g/mol and obtained by polymerization reaction of at least one acid chosen from acrylic acid, methacrylic acid and salts thereof. An aqueous suspension of the phosphate material obtained after grinding is thus preferentially formed. In the form of such a suspension, the viscosity of the phosphate material is controlled, which generally facilitates its transport.

During the preparation of the anionic polymer used according to the invention, the polymerization reaction uses at least one anionic monomer comprising at least one polymerizable olefinic unsaturation and at least one carboxylic acid group, in particular an anionic monomer comprising at least one polymerizable ethylenic unsaturation and at least one carboxylic acid group. Preferably, the anionic monomer is chosen from acrylic acid, methacrylic acid, a salt of acrylic acid, a salt of methacrylic acid. This polymerization reaction can also use these two acrylic and methacrylic acids and salts thereof.

The polymer used according to the invention may also be a copolymer obtained by a polymerization reaction using at least one other acid chosen from acrylic acid, methacrylic acid, maleic acid, itaconic acid and salts thereof, as well as at least one other comonomer which may be an ester of an acid chosen from acrylic acid and methacrylic acid.

Other comonomers which can be used in the preparation of the copolymer according to the invention include a non-ionic monomer chosen from esters of an acid comprising at least one monocarboxylic acid group, in particular an ester of an acid chosen from acrylic acid, methacrylic acid, a salt of acrylic acid, a salt of methacrylic acid and mixtures thereof. Examples of such comonomers include a compound chosen from styrene; vinylcaprolactam; alkyl acrylate, in particular $C_1$-$C_{10}$-alkyl acrylate, preferably $C_1$-$C_4$-alkyl acrylate, more preferably methyl acrylate, ethyl acrylate, propyl acrylate, isobutyl acrylate, n-butyl acrylate; alkyl methacrylate, in particular $C_1$-$C_{10}$-alkyl methacrylate, preferably $C_1$-$C_4$-alkyl methacrylate, more preferably methyl methacrylate, ethyl methacrylate, propyl methacrylate, isobutyl methacrylate, n-butyl methacrylate; aryl acrylate, preferably phenoxyethylacrylate; aryl methacrylate, preferably phenoxyethylmethacrylate. Methyl acrylate, ethyl acrylate, propyl acrylate, isobutyl acrylate, n-butyl acrylate, methyl methacrylate, ethyl methacrylate, propyl methacrylate, isobutyl methacrylate and n-butyl methacrylate are particularly preferred. Preferably, the anionic polymer according to the invention is prepared in the absence of acrylamide.

Also preferred according to the invention, the polymer used is a non-sulfonated anionic polymer. It is then prepared in the absence of a monomer comprising a sulfonated group, in particular in the absence of 2-acrylamido-2-methylpropane sulfonic acid, of 2-acrylamido-2-methylpropane sulfonic acid salt, of ethoxymethacrylate sulfonic acid, of ethoxymethacrylate sulfonic acid salt, of sodium ethallyl sulfonate, of styrene sulfonic and of salts thereof.

Preferably, the polymer used according to the invention is partially or totally neutralized. More preferably, it is partially or totally neutralized by means of at least one derivative chosen from an alkali metal, an alkaline earth metal and mixtures thereof, in particular a derivative comprising at least one element chosen from lithium, sodium, calcium, magnesium and mixtures thereof, for example NaOH, KOH, $Ca(OH)_2$. Sodium, calcium and mixtures thereof are particularly preferred. Neutralization by means of sodium and calcium can be carried out using at least one compound chosen from NaOH, $Ca(OH)_2$ and mixtures thereof. The respective proportions of sodium and calcium may vary quite widely. For example, the Na/Ca molar ratio may range from 98/2 to 30/70, preferably from 95/5 to 40/60, more preferentially from 90/10 to 30/70 or from 90/10 to 40/60, even more preferentially from 70/30 to 40/60, in particular 50/50.

Preferably, the anionic polymer used according to the invention has a molecular mass by weight ($M_W$) between 2,000 and 90,000 g/mol, preferably between 1,000 or 2,000 and 50,000 g/mol, even more preferentially between 1,000 or 2,000 and 10,000 g/mol, and more preferably between 1,500 or 2,000 and 8,000 g/mol. According to the invention, the molecular mass by weight ($M_W$) is measured by steric exclusion chromatography (SEC).

The preferred polymers used according to the invention are homopolymers of acrylic acid, in particular neutralized homopolymers of acrylic acid. The more particularly preferred polymers used according to the invention are neutralized homopolymers of acrylic acid with a molecular mass by weight ($M_W$) of between 1,000 and 10,000 g/mol, preferably between 1,500 and 8,000 g/mol. Examples of particularly preferred copolymers used according to the invention are chosen from polymer (P1): homopolymer with a molecular mass of 5,000 g/mol and obtained by polymerization of acrylic acid in the presence of copper sulfate, iron sulfate, hydrogen peroxide and 2-(1-carboxyethylsulfanylcarbothioylsulfanyl)propanoic acid (DPTTC—CAS No. 6332-91-8), neutralized with sodium and calcium (70/30 molar based on the amount of acrylic acid);

polymer (P2): homopolymer with a molecular mass of 4,200 g/mol and obtained by polymerization of acrylic acid in the presence of copper sulfate, iron sulfate, hydrogen peroxide and sodium hypophosphite, neutralized with sodium and calcium (90/10 molar based on the amount of acrylic acid);

polymer (P3): polymer with a molecular mass of 4,800 g/mol and obtained by polymerization of acrylic acid in the presence of sodium persulfate and sodium hypophosphite, neutralized with sodium and calcium (50/50 molar based on the amount of acrylic acid);

polymer (P4): homopolymer with a molecular mass of 4,200 g/mol and obtained by polymerization of acrylic acid in the presence of copper sulfate, iron sulfate, hydrogen peroxide and sodium hypophosphite, neutralized with sodium and calcium (30/70 molar based on the amount of acrylic acid).

According to the invention, the polymer used is not a flocculating agent.

For the method according to the invention, the amount of anionic polymer used may vary quite widely. Preferably, the amount by weight (dry/dry) of anionic polymer used is between 0.05 and 5%, more preferentially between 0.1 and 2%, based on the amount of phosphate material.

Also preferably according to the invention, the amount by weight (dry/dry) of anionic polymer used is between 0.1 and 5% by weight, based on the amount of phosphate material. More preferably according to the invention, the amount by weight (dry/dry) of anionic polymer used is between 0.15 and 2% by weight based on the amount of phosphate material.

Advantageously, the preparation method according to the invention does not include an additional step of concentrating the aqueous suspension of particles of phosphate material dispersed prior to the processing of the anionic polymer, while allowing the preparation of an aqueous suspension of particles of high concentration and acceptable viscosity. In particular, the viscosity of the suspension enables it to be handled or transported under conditions that are efficient from a mechanical point of view but also from an economic point of view.

When implementing the method according to the invention, the concentration of phosphate material is greater than 45% by weight. However, this concentration may be much higher. Thus and preferably, the concentration by weight of phosphate material particles in the aqueous suspension may be more than 50%, more preferably more than 55%. This concentration may be even higher and may be more than 60% or 65%. Particularly advantageously, the method according to the invention can be carried out at a concentration which may be higher than 70% or even higher.

In a particularly advantageous manner, the preparation method according to the invention allows a particularly useful and effective control of the viscosity of the aqueous suspension of phosphate material. Thus, when implementing the method according to the invention, the Brookfield viscosity measured 90 s after preparation, at 25° C., at 100 rpm and at a phosphate material concentration of more than 45% by weight, is less than 1,500 mPa·s. Preferably under these conditions, this viscosity is less than 1,200 mPa·s, more preferably less than 1,000 mPa·s. Even more preferably, this viscosity is less than 800 mPa·s or less than 500 mPa·s or even less than 350 mPa·s or less than 200 mPa·s.

Also advantageous for the preparation method according to the invention, the Brookfield viscosity of the suspension, measured 90 s after preparation, at 25° C., at 100 rpm and at a concentration of more than 60% by weight of phosphate material, is less than 1,500 mPa·s or less than 1,000 mPa·s. Preferably, this viscosity measured under these conditions is less than 800 mPa·s or even less than 500 mPa·s, 350 mPa·s or 200 mPa·s.

In the preparation of the aqueous suspension according to the invention, the phosphate material is used in the form of particles with a size of less than 400 μm. Preferably, the size of these particles is less than 200 μm or less than 150 μm. Furthermore, the size of these particles is greater than 10 μm, preferably greater than 30 μm.

Thus, for the preparation method according to the invention, the particle size of the phosphate material can range from 10 to 400 μm or from 10 to 200 μm or from 10 to 150 μm. Preferably, this size may also range from 30 to 400 μm or from 30 to 200 μm or from 30 to 150 μm.

Preferably for the preparation method according to the invention, the dispersion in water of the phosphate material particles is carried out under stirring by a suitable device. More preferably, it is carried out under mechanical stirring.

The preparation method according to the invention can be carried out at different temperatures. Preferably, it is carried out at a temperature ranging from 10 to 60° C., more preferably from 20 to 50° C. or from 25 to 50° C.

In a particularly advantageous manner, the method according to the invention makes it possible to prepare an aqueous suspension of phosphate material which is stable. This suspension preferably has a high resistance to the sedimentation of phosphate material particles, measured by evaluating the phase shift of the aqueous suspension of phosphate material particles according to the invention over time, in particular compared to a polymer-free suspension of the same viscosity.

Also preferred is a suspension with little or no dilatancy. Dilatancy can be determined by viscosity measurements at different shear rates and at a specific temperature. When the viscosity is constant or decreases as the shear rate increases, the dilatancy is low or zero.

The preparation method according to the invention allows the preparation of an aqueous suspension of at least one particular phosphate material. This suspension is part of the invention. Thus, the invention also provides an aqueous suspension of at least one phosphate material, the Brookfield viscosity of which, measured 90 s after preparation, at 25° C., at 100 rpm and at a concentration of phosphate material greater than 45% by weight is less than 1,500 mPa·s, comprising water and particles of phosphate material dispersed in the presence of at least one anionic polymer obtained by polymerization reaction of at least one acid chosen from acrylic acid, methacrylic acid and salts thereof.

Within the suspension according to the invention, the polymer is partially or totally neutralized, preferably partially or totally neutralized by means of a derivative comprising at least one element chosen from lithium, sodium, calcium, magnesium and mixtures thereof, more preferably chosen from sodium, calcium and mixtures thereof.

Advantageously, the anionic polymer is obtained by a polymerization reaction also using at least one ester of an acid chosen from acrylic acid and methacrylic acid.

Preferably, the anionic polymer has a molecular mass by weight ($M_w$) ranging from 2,000 to 90,000 g/mol or from 1,000 or 2,000 to 50,000 g/mol, even more preferentially from 1,000 or 2,000 to 10,000 g/mol or from 1,500 or 2,000 to 8,000 g/mol.

Also preferably, the amount by weight (dry/dry) of anionic polymer used is between 0.05 and 5%, more preferentially between 0.1 and 2%, based on the amount of dry phosphate material.

According to the invention, the concentration of phosphate material particles in the aqueous suspension according to the invention is greater than 45%. Preferably, this concentration by weight of phosphate material is greater than 50%, more preferentially greater than 55% and even more preferentially greater than 60% or 65%. This concentration may be even higher, reaching values of more than 70% or 75%.

The suspension according to the invention has a particularly advantageous viscosity. Preferably, this Brookfield viscosity, measured 90 s after preparation, at 25° C. and at 100 rpm, is less than 1,200 mPa·s, more preferentially less than 1,500 mPa·s, 1,200 mPa·s or 1,000 mPa·s and even more preferentially less than 800 mPa·s or less than 500 mPa·s, 350 mPa·s or 200 mPa·s.

Particularly advantageously, the aqueous suspension according to the invention has a Brookfield viscosity, measured 90 s after preparation, at 25° C., at 100 rpm and at a concentration of more than 60% by weight of phosphate material, which is less than 1,000 mPa·s, preferably less than 500 mPa·s, 350 mPa·s or 200 mPa·s.

Also, within the suspension according to the invention, the particles of phosphate material have a size of less than 400 μm, preferentially less than 200 μm or less than 150 μm. These particles have a size which is greater than 10 μm, preferably greater than 30 μm. Thus, within the suspension according to the invention, the size of the phosphate material particles can range from 10 to 400 μm or from 10 to 200 μm or from 10 to 150 μm. Preferably, this size can also range from 30 to 400 μm or from 30 to 200 μm or from 30 to 150 μm.

The method for preparing an aqueous suspension of particles of phosphate material according to the invention makes it possible to obtain such a suspension whose properties, in particular its viscosity and concentration, are particularly advantageous. Such properties make it possible to use this suspension under very varied and very advantageous conditions, in particular for its handling, transport or treatment and preferentially its treatment with a strong acid in order to prepare phosphoric acid.

Thus, the invention also provides a method of transporting an aqueous suspension according to the invention. Preferably, the method of transport according to the invention can be carried out by means of at least one means of sea transport or one means of land transport. In a particularly preferred manner, it is carried out by means of a means of land transport, for example by rail or road, or by means of a pipeline or a mini-pipeline. The properties of the aqueous suspension according to the invention are particularly suitable for a method of transport by means of a pipeline.

In addition to this method of transport and the method for preparing an aqueous suspension of a phosphate material and such an aqueous suspension, the invention also relates to a method for conditioning at least one phosphate material which makes it possible to give the phosphate material special properties.

Thus, the invention also provides a method for conditioning a phosphate material for its subsequent treatment at a temperature ranging from 40 to 100° C. by means of at least one strong acid, comprising contacting the phosphate material with at least one anionic polymer with a molecular mass by weight ($M_W$) ranging from 1,000 to 90,000 g/mol and obtained by polymerization reaction of at least one acid chosen from acrylic acid, methacrylic acid and salts thereof.

The material used in the conditioning method according to the invention is defined according to the characteristics of the anionic polymer used in the method for preparing the aqueous suspension according to the invention.

Preferably for the conditioning method according to the invention, the phosphate material is in the form of particles. More preferentially, the particle size is less than 400 μm, even more preferentially less than 200 μm or less than 150 μm. Also preferably, the particles have a size which is greater than 10 μm, more preferably greater than 30 μm. Thus, the particle size of phosphate material can range from 10 to 400 μm or from 10 to 200 μm or from 10 to 150 μm. Preferably, this size can also range from 30 to 400 μm or from 30 to 200 μm or from 30 to 150 μm.

The conditioning method according to the invention makes it possible to confer particularly advantageous properties on the particles of phosphate material. In particular, the conditioning method according to the invention makes it possible to improve the results of the subsequent acid treatment at a temperature ranging from 40 to 100° C. by means of at least one strong acid of an aqueous suspension of particles of this phosphate material according to the invention. Thanks to this conditioning method, this suspension comprises a foamy phase whose volume is limited or even zero during subsequent treatment by means of at least one strong acid. Preferably, during this treatment by means of a strong acid of an aqueous suspension according to the invention comprising a phosphate material conditioned according to the method of the invention, this suspension comprises a foamy phase whose volume is reduced to 40% or even reduced to 20% of the total volume of the suspension.

In addition and advantageously, the aqueous suspension according to the invention has a bulk density, measured by means of a pycnometer and at a solids content of more than 60% by weight, ranging from 1.5 to 2, preferably ranging from 1.7 to 2.

Preferably according to the invention, the strong acid is a strong mineral acid. More preferably according to the invention, the strong acid has a pKa of less than 4 or less than 3, or less than 2.5. Even more preferentially, the strong acid is chosen from sulfuric acid, phosphoric acid, nitric acid, hydrochloric acid and mixtures thereof. Even more preferentially, strong acid is sulfuric acid or phosphoric acid.

When the phosphate material is further treated with a strong acid, the phosphoric acid formed is present in the aqueous solution, while gypsum or phosphogypsum is also formed which must then be separated. Phosphogypsum is therefore gypsum of phosphate origin. It is calcium sulfate. Different forms of calcium sulfate may be present, including hydrated calcium sulfate, calcium sulfate dihydrate or anhydrous calcium sulfate.

Advantageously, the conditioning method according to the invention makes it possible to obtain particular crystalline forms of phosphogypsum during subsequent acid treatment. Particularly advantageously, the conditioning method according to the invention makes it possible to obtain a distribution of the different crystalline forms of particular phosphogypsum particles during subsequent acid treatment. The different crystalline forms of phosphogypsum particles, obtained by the conditioning method according to the invention being applied to the phosphate material beforehand, can be separated very efficiently, in particular by filtration. And very advantageously, these phosphogypsum particles have acicular (A), tabular (B) and compact crystal or polycrystalline aggregate (C) forms. In addition to their specific morphologies, these different crystalline forms can be characterized by their dimensions, generally according to the sizes shown in Table 1.

TABLE 1

| | length (μm) | width (μm) | thickness (μm) |
|---|---|---|---|
| acicular crystals | 80-500 | 20-100 | 5-10 |
| tabular crystals | 40-200 | 30-150 | 5-10 |
| compact crystals | 40-200 | 30-150 | several dozen |
| polycrystalline aggregates | sphere with a diameter of 50 to 100 μm | | |

Preferably, the conditioning method according to the invention makes it possible to obtain gypsum crystals with improved filterability. Advantageously, these gypsum crystals have a compact morphology. In particular, the three dimensions—length, width and thickness—of these crystals are relatively similar. Preferably, thanks to these relatively close dimensions, the gypsum crystals resulting from the implementation of the conditioning method according to the invention have a general morphology close to a spherical shape or a shape that can fit into a spherical or quasi-spherical volume. Thus, preferably, the conditioning method according to the invention makes it possible to obtain gypsum crystals whose sphericity (ratio between the radius of the inscribed circle of the particle and the radius of the circumscribed circle of the particle) which measures the deviation between the shape of the particles with respect to a spherical particle is close to 1.

The conditioning method according to the invention therefore allows efficient filtration of phosphogypsum particles. Thus, the overall chemical yield of the phosphoric acid preparation is particularly advantageous. According to the invention, the evaluation of the overall chemical yield of the phosphoric acid preparation expressed in $P_2O_5$ equivalent is carried out by comparing the titer of the $P_2O_5$ losses in the phosphogypsum during the preparation of the strong acid solution produced with the $P_2O_5$ titer of the phosphate rock starting material. The loss titration is carried out for gypsum washing solutions from which impregnated $P_2O_5$ is recovered, and for gypsum crystals in which $P_2O_5$ is present in unreacted or syncrystallized form. The overall yield is then evaluated according to the equation $$Yld = \left(1 - \frac{Pt \times CaOpp}{CaOgy \times P2O5pp}\right) \times 100$$

for which
Yld represents the chemical yield (%),
Pt represents the total $P_2O_5$ losses in gypsum,
CaOpp represents the CaO titer in the phosphate,
CaOgy represents the CaO titer in gypsum,
$P_2O_5$pp represents the $P_2O_5$ titer in the phosphate.

Advantageously, the prior implementation of the conditioning method according to the invention improves the yield of the subsequent preparation of phosphoric acid. The improvement may come in particular from a limitation of losses due to the absence of reaction, from a reduction in the trapping of phosphoric acid impregnated in the gypsum or from a better separation of the gypsum making it possible to reduce the loss of part of the phosphorus from the phosphate rock remaining in the solid residue of filtration.

In a particularly advantageous manner, the conditioning method of the invention improves the subsequent separation of gypsum crystals from phosphoric acid by filtration. The filtration coefficient or filterability can be improved by more than 0.5 t$P_2O_5$/m$^2$/d or 1 t$P_2O_5$/m$^2$/d or even 2 t$P_2O_5$/m$^2$/d, compared with a separation method which does not use a polymer.

The particular, advantageous or preferred features of the method according to the invention allow an analogous definition of suspensions and of conditioning or transport methods according to the invention which are particular, advantageous or preferred.

In a particularly effective way, the different aspects of the invention improve the efficiency of the different stages using the phosphate material. In particular, the invention significantly improves the overall chemical yield of the treatment of phosphate rock used for the preparation of phosphoric acid. The invention also significantly improves the energy efficiency of the treatment of phosphate rock and the preparation of phosphoric acid.

The following examples illustrate the different aspects of the invention.

EXAMPLE 1

Preparation and Characterization of a Phosphate Rock Pulp

From a phosphate rock pulp, which is an aqueous suspension comprising water and particles of phosphate material, the characteristics of this suspension are determined. The phosphate material comes from three deposits near Khouribga (Morocco). The pulp is prepared by mixing water and crushed and ground phosphate rock, and optionally the anionic polymer according to the invention.

If necessary, the pulp can be concentrated by centrifugation or diluted by adding water. Particle size of phosphate material:

The particle size distribution of phosphate rock pulp is measured using a Malvern Mastersizer 2000 laser diffraction granulometer. The results are shown in Table 2.

TABLE 2

| median particle size | size (µm) |
|---|---|
| $d_{10}$ | 13.33 |
| $d_{50}$ | 130.65 |
| $d_{90}$ | 280.67 |

Pulp Density:

The density is determined at 25° C. using a pycnometer of size 1,501/100 (Sheen S230729) with a volume of 100 cm$^3$. The clean pycnometer is weighed empty. The homogenized phosphate rock pulp is introduced into the pycnometer; the air present is purged and the pycnometer is closed. The full pycnometer is weighed. The mass of the empty pycnometer is subtracted from the mass of the full pycnometer, the value of this difference is multiplied by 10 and the density of the phosphate rock pulp is obtained. The results are shown in Table 3.

TABLE 3

| | solids content (% by weight) | density |
|---|---|---|
| polymer-free pulp | 51 | 1.538 |
| polymer-free pulp | 58 | 1.709 |
| pulp with polymer (P3) 0.3% by weight | 70 | 1.905 |

The use of a polymer according to the invention significantly increases the phosphate rock solids content and the density of the pulp while allowing easy handling of this concentrated pulp.

Viscosity of the Pulp:

300 g of phosphate rock pulp are introduced into a 250 mL beaker at 25° C. under mechanical stirring (600 rpm—for 2 min). If necessary, the polymer according to the invention is added in the dry/dry amounts of dry polymer relative to the amount of dry phosphate rock shown in Table 3. Stirring is stopped and, after 90 s, the viscosity is measured at 25° C. by means of a Brookfield viscometer equipped with a type S63 spindle at a rotation speed of 100 rpm. The results are shown in Table 4.

TABLE 4

|  | solids content (% by weight) | viscosity (mPa · s) |
|---|---|---|
| polymer-free pulp | 70 | not measurable |
| pulp with polymer (P1) 0.2% by weight | >70 | 230 |
| pulp with polymer (P3) 0.3% by weight | >70 | 260 |

Whereas polymer-free pulp does not allow viscosity to be measured, the pulp comprising polymer according to the invention has a controlled viscosity which makes it easily handled and transportable, in particular by gravity.

Pulp Stability—Phase Shift Measurement:

200 mL of phosphate rock pulp are introduced into a 250 mL beaker at 25° C. under mechanical stirring (2,050 rpm—for 2 min). If necessary, the polymer according to the invention is added in the dry/dry amounts relative to the amount of dried phosphate rock shown in Table 4. Then, 100 mL of pulp are poured into a graduated test tube and the volumes of the different phases that form are recorded over time. During sedimentation, two phases may appear. Phase 1, which is water and does not include particles of phosphate material due to the occurrence of a pulp separation phenomenon. Phase 2, which includes water and particles of phosphate material. The measured phase 1 volumes (mL) are shown in Table 5. This is a measure of the phase shift over time related to the sedimentation rate.

TABLE 5

| time (h) | 50% polymer-free pulp | 60% pulp with polymer (P1) 0.15% by weight |
|---|---|---|
| 1 | 0.5 | 0 |
| 2 | 1 | 0 |
| 3 | 1.5 | 0 |
| 19 | 8 | 5 |
| 24 | 9 | 6 |

It can be seen that the presence of the polymer according to the invention makes it possible to obtain a suspension which is more concentrated in particles of phosphate material and which is more stable. In fact, the amount of phase-shifted pulp is nil or very much reduced in comparison with pulp containing no polymer.

Pulp Stability—Determination of Dilatancy:

The dilatancy of the phosphate rock pulp is measured with a Haake Rheostress 600 rheometer equipped with a CC20Ti cylindrical spindle. The dilatancy at 30° C. of a pulp sample (16 mL) is determined by measuring the viscosity regularly by increasing the speed of the spindle from 0 to 1,500 rpm (0 to 660 s$^{-1}$) in 120 s. The results obtained are shown in Table 6. Such a viscosity measured at varying shear rates makes it possible to evaluate the dilatancy of the pulp. Thus, if the viscosity increases as an increasing shear rate is applied, the slurry expands.

TABLE 6

| pulp (solids content-% by weight) | viscosity (mPa · s) | |
|---|---|---|
|  | at 2 s$^{-1}$ | at 600 s$^{-1}$ |
| polymer-free pulp (>70) | not measurable | not measurable |
| pulp with polymer (P3) 0.1% by weight (60) | 7,290 | 96 |

Once again, while the pulp without polymer does not allow viscosity measurement, the pulp comprising polymer according to the invention has a controlled viscosity which makes it easily handled and transportable, in particular by gravity. Moreover, it can be seen that its viscosity does not increase with increasing shear rate; the suspension according to the invention is not dilatant.

EXAMPLE 2

Preparation of Phosphoric Acid and Characterization of its Quality

The phosphate material particles of an aqueous suspension according to Example 1 are treated in a manner known as such with sulfuric acid. A slurry is obtained which is filtered to separate the phosphogypsum and to obtain an aqueous solution of phosphoric acid. A solution of strong phosphoric acid is obtained. If necessary, it can be concentrated by evaporation of water under suction. Washing the phosphogypsum with an aqueous solution of phosphoric acid or with water or sulfate-rich water can produce medium or weak phosphoric acid solutions.

A similar procedure is used for different suspensions prepared according to Example 1. The quality of phosphoric acid is characterized by different parameters. The filtration time provides information on the shape of the phosphogypsum crystals present in the phosphate material. The filtration time also provides information on the quality of the phosphoric acid produced. The density indicates the titer of the phosphoric acid produced and must be above 1.266 at 25° C. to reach a generally acceptable quality.

The amount of free sulfate present in the acid (g/L) is estimated from the level of residual sulfuric acid that did not react during the treatment of the phosphate material particles in the suspension. A high level means a low phosphoric acid titer and a high phosphogypsum filtration time. Preferably, the aqueous phosphoric acid solution contains residual sulfate ions in a weight concentration of 20 to 35 g/L. More preferably, the aqueous phosphoric acid solution comprises residual sulfate ions in a weight concentration ranging from 22 to 26 g/L. The filterability of the phosphate material suspension (tons $P_2O_5/m^2$/day) enables the production capacity of strong phosphoric acid to be evaluated. The filterability of phosphogypsum is linked to its crystallinity. Particular shapes of phosphogypsum crystals can lead to piling up which degrades the efficiency of filtration or to filter clogging. Filterability should range from 5 to 7, preferably from 6 to 7, on a scale of 1 to 7. Filterability F is calculated according to the formula:

$$F = \frac{A}{\left(1 - \frac{B}{100}\right) * \sqrt{t1 + t2 + t3}}$$

where

A=17.80 measuring technique specific constant,

B=moisture content of the phosphogypsum (% by weight), t1=filtration time of strong phosphoric acid (s), t2=average phosphoric acid filtration time (s), t3=filtration time of weak phosphoric acid (s).

The results obtained are shown in Table 7.

TABLE 7

| pulp (solids content-% by weight) | filterability |
|---|---|
| polymer-free pulp (60) | 5 |
| pulp with polymer (P1) 0.2% by weight (>70) | 7 |
| pulp with polymer (P3) 0.3% by weight (>70) | 6 |

The presence of polymer according to the invention in the aqueous suspension of particles of phosphate material makes it possible to obtain a filterability maintained or even improved while making it possible to increase the solids content. The efficiency of the method for producing strong phosphoric acid is improved.

Density of the Strong Acid:

After acid treatment and filtration of the phosphate material suspension, the density of the strong phosphoric acid is measured with a densimeter, graduated from 1,200 to 1,300 or from 1,300 to 1,400, and at a temperature of 25° C. The results obtained are shown in Table 8. Quality of the phosphoric acid produced: density and titer of the strong acid After acid treatment and filtration of the phosphate material suspension, the density of the strong phosphoric acid is measured with a densimeter, graduated from 1,200 to 1,300 or from 1,300 to 1,400, and at a temperature of 25° C. The titration of the phosphoric acid solution is carried out in a manner known per se. The results obtained are shown in Table 8.

TABLE 8

| pulp (solids content-% by weight) | density | filterability | $P_2O_5$ titer |
|---|---|---|---|
| polymer-free pulp (60) | 1.274 | 5.4 | 25.33 |
| pulp with polymer (P3) 0.3% by weight (>70) | 1.297 | 6.1 | 28.30 |

The presence of polymer according to the invention in the aqueous suspension of particles of phosphate material makes it possible to prepare a highly concentrated pulp with very improved properties. The $P_2O_5$ titer is improved. Similarly, the acid density is improved.

When phosphoric acid is prepared by treating the aqueous suspension of phosphate material particles with sulfuric acid, the phosphogypsum (calcium sulfate) crystals must have controlled dimensions to improve their separation by filtration. The sizes and dimensions of the crystals of different filtration retentate are determined using an optical microscope (Olympus SZX-ILLD200, DF PLFL 1.6* PF objective) producing images processed with Imagej software. Different crystal forms are present: acicular (A), tabular (B) or compact crystals or polycrystalline aggregates (C). For these crystals of different shapes, several size ranges are present. Among these crystals are oblong crystals of about 250 μm or 220-350 μm in size (Q1), semi-oblong crystals of about 150 μm or 125-160 μm in size (Q2) and more compact or star-shaped crystals of about 50 μm or 40-85 μm in size (Q3). Type (Q3) crystals provide the best filterability results.

The relative amounts of type (Q3) crystals are increased and the filterability of phosphogypsum crystals is improved.

Evaluation of Losses of Phosphoric Acid Produced:

In the preparation of phosphoric acid expressed in $P_2O_5$ equivalent, the overall chemical yield of the phosphoric acid preparation may be reduced due to acid losses. Generally, the method of acid preparation leads to losses of acid in different forms. These losses can be identified and measured. Part (A) of the product losses corresponds to the phosphoric acid present in the phosphate rock which is not attacked during acid treatment. Part (B) of the phosphoric acid product losses is related to the acid trapped in syncrystallized form within the phosphogypsum crystals. Part (C) of the phosphoric acid product losses results from the presence of acid in solution in the wash waters. The results are shown in Table 9.

TABLE 9

| pulp (solids content-% by weight) | $P_2O_5$ losses (% by weight) | | | $P_2O_5$ yield (% by weight) |
|---|---|---|---|---|
| | A | B | C | |
| polymer-free pulp (60) | 0.12 | 0.81 | 0.82 | 92 |
| polymer-free pulp (>70) | 0.12 | 0.67 | 0.67 | 94.3 |
| pulp with polymer (P3) 0.3% by weight (>70) | 0.08 | 0.68 | 0.25 | 95.3 |

In addition to a strong improvement in the overall efficiency of the phosphoric acid preparation reaction, the use of a polymer according to the invention in the aqueous suspension of particles of phosphate material reduces the various losses of phosphoric acid. In particular, the acid losses resulting from the unattacked phosphate material during acid treatment are greatly reduced.

The conditioning method according to the invention therefore confers special properties on the particles of phosphate material as well as on the mixture of particles of phosphate material and polymer according to the invention.

The invention claimed is:

1. A method for preparing an aqueous suspension of at least one phosphate material, the aqueous suspension having a Brookfield viscosity, measured 90 s after preparation, at 25° C., at 100 rpm and at a concentration of phosphate material of more than 45% by weight, which is less than 1,500 mPa·s, the method comprising the dispersion in water of particles of phosphate material whose size is between 10 and 400 μm, in the presence of at least one anionic non-sulfonated polymer with a molecular mass by weight ($M_W$) of between 1,000 and 90,000 g/mol and obtained by polymerization reaction, in absence of acrylamide, of at least one acid chosen from acrylic acid, methacrylic acid and salts thereof, and optionally at least one other comonomer selected from the group consisting of acrylic acid, methacrylic acid, maleic acid, itaconic acid and salts thereof, styrene, vinylcaprolactam, propyl acrylate, isobutyl acrylate, n-butyl acrylate, alkyl methacrylate, and aryl acrylate, wherein the amount by weight (dry/dry) of anionic polymer used is between 0.05 and 5% based on the amount of phosphate material.

2. The preparation method according to claim 1, wherein the dispersion is carried out after the phosphate material has been crushed.

3. The preparation method according to claim 1, wherein the polymer is partially or totally neutralized.

4. The preparation method according to claim 1, wherein the anionic polymer has a molecular mass by weight ($M_W$) between 2,000 and 90,000 g/mol.

5. The preparation method according to claim 1, wherein the amount by weight (dry/dry) of anionic polymer used is between 0.1 and 2%, based on the amount of phosphate material.

6. The preparation method according to claim 1, wherein the concentration by weight of particles of phosphate material in the aqueous suspension is greater than 50%.

7. The preparation method according to claim 1, wherein the Brookfield viscosity of the suspension, measured 90 s after preparation, at 25° C. and at 100 rpm, is less than 1,200 mPa·s.

8. The preparation method according to claim 1, wherein the Brookfield viscosity of the suspension, measured 90 s after preparation, at 25° C. and 100 rpm and at a concentration of more than 60% by weight of phosphate material, is less than 1,500 mPa·s.

9. The preparation method according to claim 1, wherein the particles of phosphate material have a size between 30 μm and 200 μm.

10. The preparation method according to claim 1, wherein the dispersion in water of the phosphate material particles is carried out under stirring.

11. An aqueous suspension of at least one phosphate material, having a Brookfield viscosity, measured 90 s after preparation, at 25° C., at 100 rpm and at a concentration of phosphate material greater than 45% by weight, which is less than 1,500 mPa·s, the aqueous suspension comprising water and particles of phosphate material having a size of between 10 and 400 μm and dispersed in the presence of at least one anionic non-sulfonated polymer with a molecular mass by weight ($M_W$) of between 1,000 and 90,000 g/mol and obtained by polymerization reaction, in absence of acrylamide, of at least one acid chosen from acrylic acid, methacrylic acid and salts thereof and optionally at least one other comonomer selected from the group consisting of acrylic acid, methacrylic acid, maleic acid, itaconic acid and salts thereof, styrene, vinylcaprolactam, propyl acrylate, isobutyl acrylate, n-butyl acrylate, alkyl methacrylate, and aryl acrylate, wherein the amount by weight (dry/dry) of anionic polymer used is between 0.05 and 5%, based on the amount of phosphate material.

12. The aqueous suspension according to claim 11, wherein the polymer is partially or totally neutralized.

13. The aqueous suspension according to claim 11, wherein the anionic polymer is obtained by a polymerization reaction also using at least one ester of an acid chosen from acrylic acid and methacrylic acid.

14. The aqueous suspension according to claim 11, wherein the anionic polymer has a molecular mass by weight ($M_W$) between 2,000 and 90,000 g/mol.

15. The aqueous suspension according to claim 11, wherein the amount by weight (dry/dry) of dry anionic polymer used is between 0.1 and 2%, based on the amount of dry phosphate material.

16. The aqueous suspension according to claim 11, wherein the concentration by weight of particles of phosphate material is greater than 50%.

17. The aqueous suspension according to claim 11, the Brookfield viscosity of which, measured 90 s after preparation, at 25° C. and at 100 rpm, is less than 1,200 mPa·s.

18. The aqueous suspension according to claim 11, the Brookfield viscosity of which, measured 90 s after preparation, at 25° C., at 100 rpm and at a concentration of more than 60% by weight of phosphate material, is less than 1,500 mPa·s.

19. The aqueous suspension according to claim 11, wherein the particles of phosphate material have a size between 30 μm and 200 μm.

20. A method for conditioning a phosphate material, for its subsequent treatment at a temperature ranging from 40 to 100° C. by means of at least one strong acid, comprising contacting the phosphate material with at least one anionic non-sulfonated polymer with a molecular mass by weight ($M_W$) of between 1,000 and 90,000 g/mol and obtained by polymerization reaction, in absence of acrylamide of at least one acid chosen from acrylic acid, methacrylic acid and salts thereof and optionally at least one other comonomer selected from the group consisting of acrylic acid, methacrylic acid, maleic acid, itaconic acid and salts thereof, styrene, vinylcaprolactam, propyl acrylate, isobutyl acrylate, n-butyl acrylate, alkyl methacrylate, and aryl acrylate, wherein the amount by weight (dry/dry) of anionic polymer used is between 0.05 and 5%, based on the amount of phosphate material.

21. The conditioning method according to claim 20, wherein the polymer is partially or totally neutralized.

22. The conditioning method according to claim 20, wherein the phosphate material is in the form of particles.

23. The conditioning method according to claim 20, wherein the aqueous suspension comprises, during subsequent treatment at a temperature ranging from 40 to 100° C. by means of at least one strong acid, a foamy phase whose volume is reduced to 40% of the total volume of the suspension or, wherein the aqueous suspension has a bulk density, measured by means of a pycnometer and at a solids content of more than 60% by weight, ranging from 1.5 to 2.

* * * * *